United States Patent [19]
Sanders et al.

[11] Patent Number: 5,414,646
[45] Date of Patent: May 9, 1995

[54] DIGITAL OPTICAL MICROMETER

[75] Inventors: David L. Sanders, Leavenworth, Kans.; Timothy J. Rolbiecki, Kansas City, Mo.

[73] Assignee: Brunson Instrument Company, Kansas City, Mo.

[21] Appl. No.: 869,371

[22] Filed: Apr. 16, 1992

[51] Int. Cl.$^6$ .......................................... G01N 21/00
[52] U.S. Cl. .................. 364/556; 364/559; 364/560; 364/505; 33/813; 33/814
[58] Field of Search ............... 364/559, 560, 505, 707, 364/556; 73/1 E; 356/140, 138; 33/366, 814, 813; 350/10

[56] References Cited

U.S. PATENT DOCUMENTS

| | | | |
|---|---|---|---|
| 4,082,418 | 4/1978 | Keydell et al. | 350/10 |
| 4,281,928 | 8/1981 | Brunson | 356/140 |
| 4,422,243 | 12/1983 | Brunson et al. | 33/366 |
| 4,486,844 | 12/1984 | Brunson et al. | 364/559 |
| 4,549,277 | 10/1985 | Brunson et al. | 364/559 |
| 4,588,253 | 5/1986 | Brunson | 350/1.1 |
| 4,752,126 | 6/1988 | Fujii | 356/140 |
| 4,825,143 | 3/1989 | Cheng | 323/351 |
| 4,952,817 | 8/1990 | Bolan et al. | 307/29 |
| 5,021,983 | 6/1991 | Nguyen et al. | 364/707 |
| 5,065,357 | 11/1991 | Shiraishi et al. | 395/200 |

OTHER PUBLICATIONS

IBM Technical Disclosure Bulletin, vol. 29, No. 6, Nov. 1986, pp. 2641–2643, "Method for Warning Users of a Low Battery Condition on a Battery Powered Computer".

"Geodimeter ® Systems for Computer-Aided Mapping", No month, 1983, 4 pages, printed in Sweden Publ. No. 571 140 340.

"The very first powerful field system for Tacheometry", no month, 1986, 5 pages, Printed in Sweden Publ. No. 571 140 672.

Brunson Brochure, Model 190 Optical Micrometer Maintenance and Adjustment Manual, pp. 1–6, no month, 1990.

Brunson Measures the World Optical Tooling Catalog, 1990, no month, pp. 1–86.

Primary Examiner—Emanuel T. Voeltz
Assistant Examiner—Hal D. Wachsman
Attorney, Agent, or Firm—Stinson, Mag & Fizzell

[57] ABSTRACT

A digital optical micrometer for mounting on an optical instrument and having an optical flat plano-parallel window which is connected to a micrometer drum. The drum can pivot or incline the optical plano-parallel window to cause displacement of a line of sight. The digital optical micrometer further has an LCD read-out that indicates the amount of displacement of the line of sight, a circuit that is connected to the optical plano-parallel window and provides an electrical signal having a signal property which varies in proportion to the inclination of the line of sight, and an analog-to-digital converter that is connected to the circuit and converts the electrical signal to a digital word having a binary value representative of the inclination of the line of sight. The optical micrometer further has a computer which has a clock input that provides for an automatic power down of the micrometer. The micrometer includes a linkage arrangement rotating the optical flat window which minimizes the error effect of gear backlash.

18 Claims, 6 Drawing Sheets

DIGITAL OPTICAL MICROMETER

FIELD OF THE INVENTION

The present invention is directed to instruments for optical alignment, and more particularly, to such instruments which are made with precision for use in optical tooling and that are electronic, computer controlled digital optical micrometers.

BACKGROUND OF THE INVENTION

Various instruments for use in optical tooling are known in the art and used to establish an optical reference line parallel to one axis of the object being worked upon and then to establish optical planes at right angles to the basic reference line. Known optical tooling instruments often require the use of multiple operators and instruments for verification and calibration purposes to insure that a particular "shot" or line of sight remains in a plane parallel to the reference line or plane. Normally, an optical micrometer will need no maintenance beyond cleaning the cover glass on its front and periodic calibration. However, if the micrometer is used in environments with heavy airborne dirt and grime, it usually requires the micrometer to be sent back to the factory for complete disassembly, cleaning and recalibration. Often, the calibration of the optical micrometer may be attempted at the field site. Because of the need of accuracy, however, the calibration procedure should only be attempted by technicians with proper training and experience in the use and calibration of optical measurement equipment.

In calibrating an optical micrometer, specific steps must be followed. Normally, the steps for calibrating an optical micrometer will determine the backlash, zero centering and range accuracy of the micrometer. The backlash test determines the backlash in the sector gear of a conventional optical micrometer. Because correction of the backlash requires complete disassembly of the micrometer, it should not be attempted in the field. Therefore, if after checking for the backlash, the user cannot repeat the readings with less than one half of one minor graduation of backlash in either direction of zero, the micrometer cannot be calibrated accurately. The micrometer must be returned to a repair facility. If the backlash test provides a reading of zero or less than one half of one minor graduation in error, then the micrometer may be calibrated further and then used.

A zero centering calibration test requires mounting micrometer, then placing a bi-filar target about three feet away from the micrometer and at least nominally perpendicular to its line of sight, setting the micrometer calibration drum to zero, then using tangent screws to register the measuring reticle line (the line that moves when the micrometer drum is turned) precisely on the target. The other reticle line should be approximately on the target. The next step is to rotate the micrometer 180 degrees about the test instrument barrel. If needed, the micrometer drum is turned to bring the measuring reticle line back onto the target. If the reading of the micrometer drum is not less than one-half of one minor graduation, then a zero centering of the graduated ring will be required.

In checking the range accuracy of the optical micrometer, the operator will be checking the axial position (range symmetry) and operating radius (range length) of the sector pin. Because changing the sector pin geometry affects the zero centering, this calibration can be very complicated. If a correction to either dimension of the micrometer range is made, then a recalibration of the zero centering is required. Therefore, there is a need for an optical micrometer that can be easily calibrated at the field site without requiring such elaborate calibration steps and direct reading to eliminate backlash.

Accordingly, there is a need for a digital optical micrometer that can be reliably turned on by just pressing a button and that can provide instant calibration of the range and zero centering of the optical micrometer. Further, there is a need for a digital optical micrometer that does not require the backlash test because of the use of a direct reading system of the optical flats position that directly senses the angle of the optical flat window rather than sensing the position of gears that position the window. Additionally, there is a need for a digital optical micrometer that includes a programmable LCD read-out which can be inverted at a touch of a button, an automatic shut-off system and change of units.

SUMMARY OF THE INVENTION

In the preferred embodiment, the instant invention includes an optical micrometer with an LCD read-out that is powered by a long life battery and which can be calibrated by merely pressing a button to set the range and zero centering. The digital optical micrometer further provides a programmable read-out that includes a metric or English standard display at the touch of a button, a 45 second intermediate interval power down that freezes the display after a 45 second interval of inactivity, thereby saving the battery life, and an automatic shut-off system of the computer after a programmable interval of five, ten or fifteen minutes of inactivity. The preferred embodiment does not require any alterations to fit on an optical tooling instrument, but can simply substitute for the prior conventional optical micrometer. The preferred embodiment also does not use a gearing system for movement of the optical window but relies upon a direct linkage arrangement to minimize backlash.

OBJECTS OF THE INVENTION

Accordingly, it is the primary object of the present invention to provide an optical micrometer with an electronic calibration system that calibrates the range and zero centering.

It is a further object of the present invention to provide a digital optical micrometer that eliminates the need for the backlash calibration test.

It is a further object of the present invention to provide a digital optical micrometer that includes a long life battery that can be easily replaced at a very low cost.

It is a further object of the present invention to provide a digital optical micrometer with an LCD read-out which can be inverted at a touch of a button for shots in which the micrometer is upside down.

It is a further object of the present invention to provide a digital optical micrometer having the means for selectively displaying metric or standard units at the touch of a button.

It is a further object of the present invention to provide a digital optical micrometer with an automatic shut-off system having the means for selectively programming the powered down interval after a period of inactivity.

It is a further object of the present invention to provide a digital optical micrometer that requires no alterations of any kind and simply can replace the prior conventional optical micrometer.

It is a further object of the present invention to provide a digital optical micrometer having a movable optical window with a direct reading arrangement eliminating gear back lash error.

Other objects and advantages of this invention will become apparent from the following discussion taken in conjunction with the accompanying drawings, wherein are set forth, by way of illustrating an example, certain embodiments of this invention.

DESCRIPTION OF THE DRAWINGS

FIG. 7 is a block diagram illustrating the principal functional portions of an analog-digital converter chip and a microcontroller located within the digital optical micrometer.

DETAILED DESCRIPTION OF THE PREFERRED EMBODIMENT

As required, a detailed embodiment of the present invention is disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
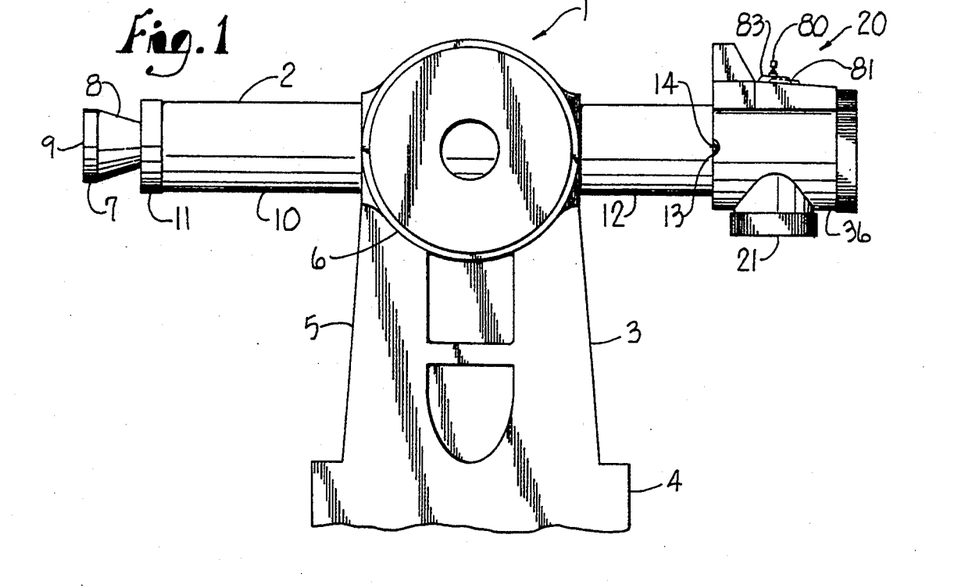
FIG. 1 is an elevational view of a digital optical micrometer embodying the present invention and mounted on an optical transit square instrument.

Referring to the drawings in more detail:

The reference numeral 1, FIG. 1, generally designates a precision optical transit square instrument for optical tooling for use in accurately determining lines and planes oriented horizontally and vertically. The instrument 1 employs a main or first telescope 2 that is mounted and supported by a standard support 3 rotatable about a spindle base 4. The standard support 3 has standard support arms 5 with respective trunnions 6 to support the telescope 2 on the support arms 5 about a first axis and positioned perpendicular of a second axis about which the standard support 3 rotates.

For purposes of simplicity of illustration and example, the transit square instrument 1 is oriented with its spindle 4 vertical so that the main telescope 2, during rotation of the standard support 3 about the spindle 4, sweeps a horizontal plane and is able to focus upon points or locations in a horizontal plane. However, it will be understood that the spindle base 4 may be positioned so that the spindle base 4 does not have a vertical orientation and, in which case, the orientation of the plane is defined by rotation and/or sweeping of the telescope 2 will accordingly differ from the situation described above.

Figure 4:
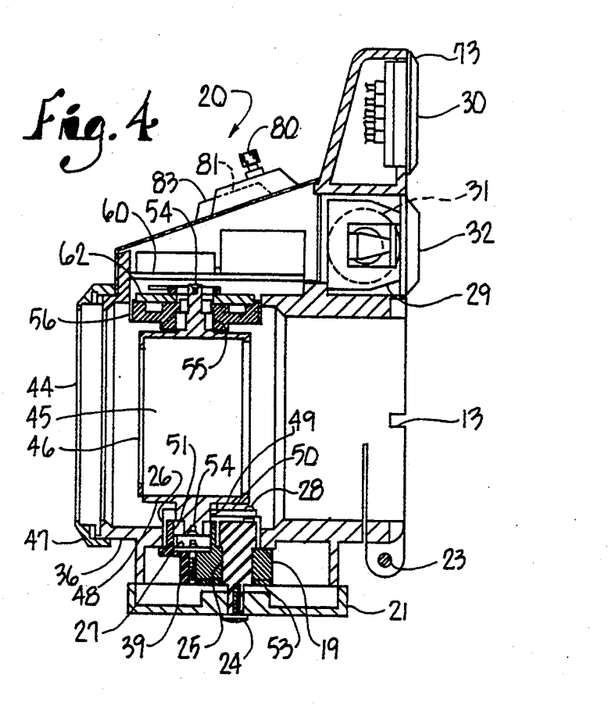
FIG. 4 is a sectional view taken along lines 4—4, FIG. 2.

The telescope 2 is focusable and includes an eyepiece 7, eyepiece lens 8, a cap 9 to cover the eyepiece 7, a telescope barrel 10, an eyepiece end 11 of the telescope barrel 10 and an objective end 12 of the telescope barrel 10. In the illustrated example, a digital optical micrometer 20 is fitted coaxially to the objective end 12 of the telescope barrel 10 with spaced slots 13 abutting barrel pins 14 as a stop. A micrometer drum 21 is operatively and electrically connected to an optical plano-parallel window 45, as illustrated in FIG. 4, for pivoting or inclining the optical plano-parallel window 45 in response to rotation of the micrometer drum 21. The digital optical micrometer 20 further includes a digital read-out 30, a power button 80, a function select slide switch 81, and a main body tube 36 that is coaxially fitted over the telescope barrel 10.

Figure 2:
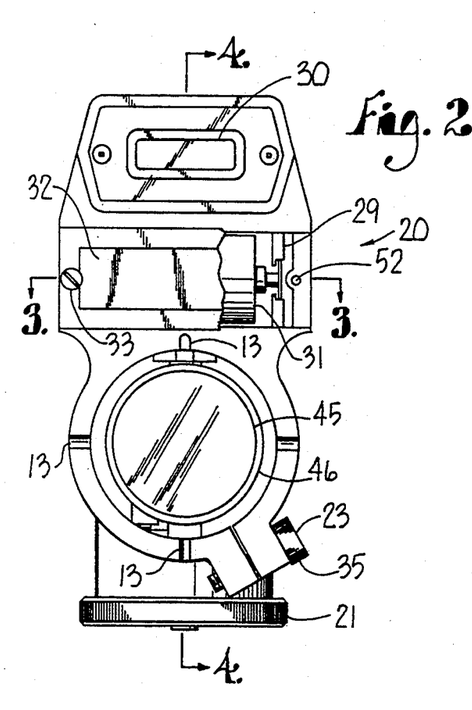
FIG. 2 is an elevational end view of the optical micrometer and showing an LCD display.

The digital optical micrometer 20 is secured on the telescope barrel 10 by a clamp screw assembly 23, as illustrated in FIG. 2. The clamp screw assembly 23 includes a thumb screw 35. The rotation of the micrometer drum 21 causes a linkage arrangement described hereafter to pivot or incline the optical plano-parallel window 45. This displaces the line of sight through the telescope 2 and the amount of displacement is indicated on the LCD read-out 30. The LCD read-out 30 is electrically powered by a long life battery 31 that is inserted in the optical micrometer 20 and held in place by a battery holder 29 protected by the battery cover 32. Battery cover screws 33 are inserted in the battery cover screw threaded holes 52.

The displacement of the line of sight is accomplished by positioning the optical plano-parallel window 45 perpendicular to the line of sight. The optical plano-parallel window 45 is an optical flat with a known index of refraction and thickness. In the perpendicular position, the optical plano-parallel window 45 has no effect on the line of sight, but as the optical plano-parallel window 45 degree angle to the line of sight is changed, the line of sight will be displaced. The displacement of the line of sight is dependent upon the equation below.

$$D = (t)(\mathrm{Sin}(I))\left[1 - \frac{1 - \mathrm{Sin}\ 2(I)}{N\ 2 - \mathrm{Sin}\ 2(I)}\right]^{\frac{1}{2}}$$

where:
  D = displacement of the line of sight
  t = glass or optical plano-parallel window 45 thickness
  N = glass INDEX of refraction
  I = angle of incidence Referring to FIG. 4, the illustrated optical plano-parallel window 45 is mounted to provide a mechanical axis that is aligned with the optical axis of the telescope barrel 10. The optical plano-parallel window 45 is held by a window retainer ring 46 and a window mount 48. The window mount 48 is connected to a bar linkage system 50 through a window mount post 49.

The bar linkage system 50 is connected to the drum shaft cam 25 through a drum shaft post 28. The drum shaft cam 25 is connected to the micrometer drum 21 by a drum retaining screw 24. The drum shaft cam 25 is located and supported by a mounting support 19 that is made preferably of brass. The mounting support 19 has brake spring washer 53 that produces drag on the drum 21 to prevent the drum 21 from rotating freely.

The window mount 48 rotates about upper and lower shafts 54 and is connected to a bottom window bearing 51 and a top window bearing 55. The window mount 48 is held in place by a thrust washer 27 which is adjusted upward or downward by a drum inner screw 39. The bottom window bearing 51 is connected to a drum shaft bearing 26. Adjusting the drum inner screw 39 helps maintain tension on the window mount 48. Alignment is maintained by the bearing 26 and the resistance element mount 56 which have some adjustment capability and are held in place by screws.

Figure 3:
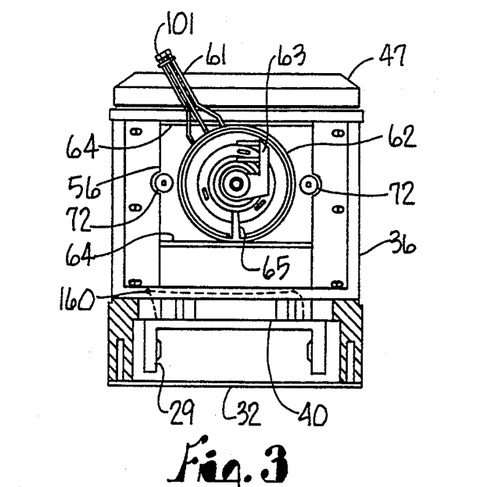
FIG. 3 is a sectional view taken along lines 3—3 FIG. 2

The top window bearing 55 is located within a resistance element mount 56 that supports an assembly resistance element 62. As illustrated in FIG. 3, the resistance element 62 includes a brush wiper 63 that makes electrical contact with a circuit board connection 65. The resistance element 62 is maintained in position in the main body tube 36 by sealer 64, and has electrical wiring 61 that is connected to a computer circuit board 60, FIG. 4, through a terminal socket connection 101.

The resistance element mount 56, FIG. 3, is connected to the main body tube 36 by retaining screws 72, and is located between a front glass cover retainer 47 and behind a rear battery chamber 40. The battery chamber 40 includes a battery holder 29 and is protected by the battery cover 32.

Referring again to FIG. 4, the optical plano-parallel window 45 is protected by a cover glass 44 that is held in place by a glass cover retainer 47. Therefore, rotation of the micrometer drum 21 causes the drum shaft 25 to rotate, thereby moving the bar linkage system 50. The movement of the bar linkage system 50 pivots the window mount 48 and inclines the optical plano-parallel window 45. The inclination of the optical plano-parallel window 45 displaces a line of sight through the optical plano-parallel window 45. The amount of displacement can be read in one half thousandths of an inch (0.0005") or hundredths of a millimeter (0.01 millimeter), either side of zero off the LCD digital display 30 (operation mode).

Figures 5, 6:
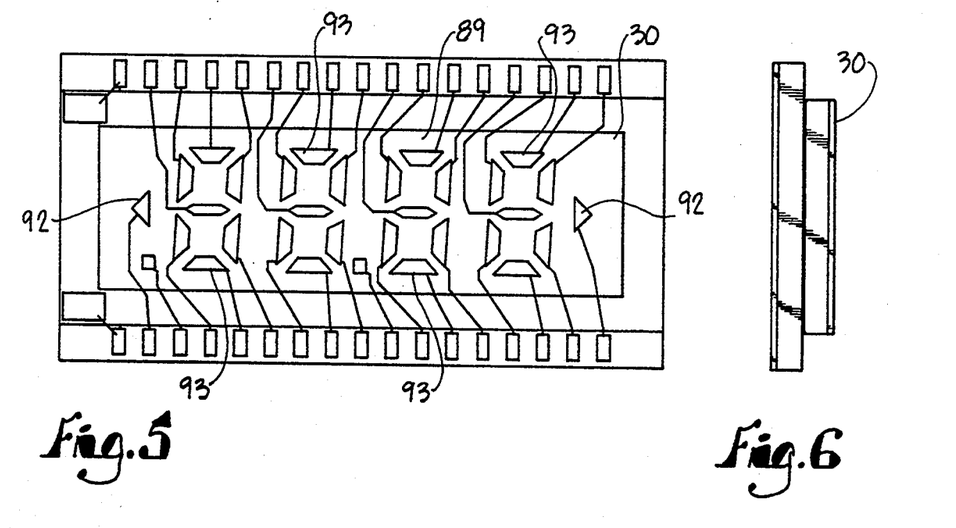
FIG. 5 is an enlarged, sectional view of the LCD digital display.
FIG. 6 is an end elevational view of the LCD digital display.

The LCD digital display 30 consists of four 7-segment LCD digits 93 as shown in FIG. 5. An arrow 92 on each side of the display 30 indicates the direction of the line of sight displacement. The unit of measure (millimeters or inches) can be programmed in a Function Select Menu. The displayed resolution is to the nearest one-half thousandths of an inch (0.0005").

Figure 8:
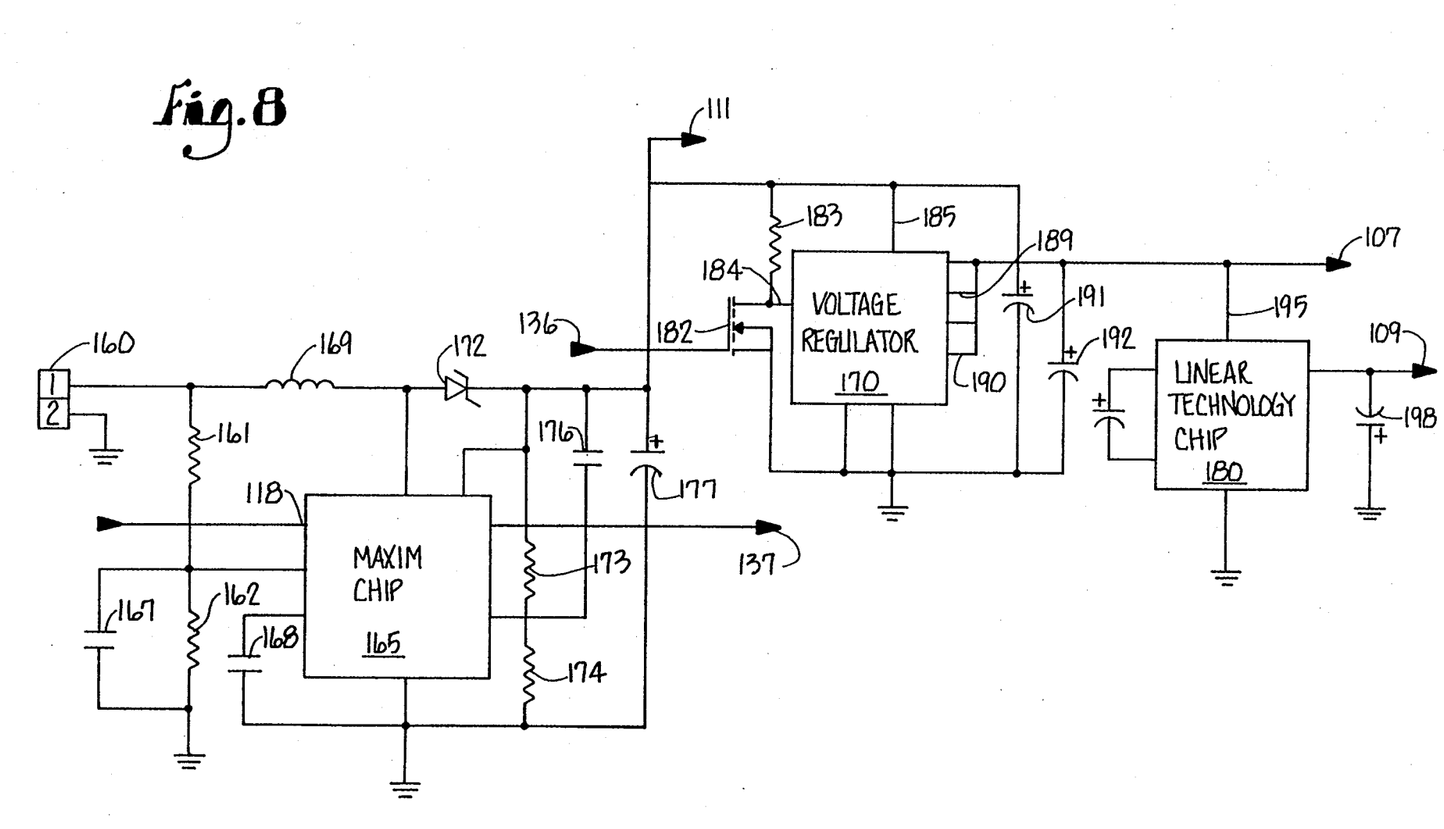
FIG. 8 is a block diagram illustrating the principal functional power supply portions of electrical circuits within the digital optical micrometer.

As shown best in FIGS. 3 and 8, the optical micrometer 20 is powered by a three volt battery 31 that preferably has a 1300 milliamp capacity and a battery life of approximately 300 hours. The preferred battery type is lithium. The battery 31 is electrically connected through the battery holder 29 to a connector 160 of the computer circuit board 60.

The computer circuit board 60 is electrically connected to the resistance element 62, FIG. 3, through the circuit board connector 101. The wiper 63, which contacts the resistance element 62, is connected to the rotating axis of the window mount 48 which holds the optical plano-parallel window 45, FIG. 4. The wiper 63 and resistance element 62 produce an electrical signal which will vary proportionally to a change in angle of the optical plano-parallel window 45 with respect to the electric function angle of the resistance element 62. The window mount 48 position is then sensed and electrically transmitted through the electrical wiring 61 to the computer circuit board 60. The computer circuit board 60 derives the line of sight displacement and electronically transmits the displacement of the line of sight to a digital read-out on the LCD display 30.

The digital optical micrometer 20 is initially turned on by pressing the power button 80, that is preferably red in color, located behind the display 30, FIG. 1. No "off" button exists. If no movement of the micrometer drum 21 has been detected by the computer circuit board 60 for one of the programmable time intervals (5, 10 or 15 minutes), the micrometer 20 will automatically power down. The time intervals are selected from the Function Select Menu. In addition to the automatic power down procedure, an intermediate power down period exists. If the micrometer drum 21 has not been moved for 45 seconds, the LCD display 30 will freeze until either the micrometer drum 21 is moved, or the selected power down interval period passes and the micrometer 20 powers down or shuts itself off.

During a measurement operation, the digital read-out 30 may become inverted and to compensate for the inverted position of the display face 89, the digits 93, as illustrated in FIG. 5, can be selectively switched between the inverted and upright states by pressing the power button 80. The computer circuit board 60 includes a serial electrically erasable programmable read only memory (EEPROM) component 145, FIG. 7a, that allows the computer 60 to store the state of the display 30 when the micrometer 20 powers down. Upon powering up, the display 30 state (inverted or upright) will be as it was at power down.

The optical micrometer 20 derives the position of the optical plano-parallel window 45 with respect to the line of sight by using the resistance element 62 and the brush wiper 63. The brush wiper 63 is directly connected to the rotating axis of the window mount 48 which contains the optical plano-parallel window 45. By pressing the power button 80 located behind the digital display 30, a voltage is applied across the resistance element 62 so that a voltage to the optical plano-parallel window 45 position relationship will exist. The computer circuit board 60 includes an analog-to-digital converter 110, FIG. 7, that in the preferred embodiment is a Maxim analog to digital converter chip max134. Using the analog-to-digital converter 110, the position of the optical plano-parallel window 45 is represented by a voltage converted to a binary number that is electrically transmitted to an 8 bit microcontroller 135, that in the preferred embodiment is a Signetics 87C751 microcontroller chip. The results of applying the displacement equation stated above, results in a non-linear function. The microcontroller 135, therefore, is programmed with a binary look-up table that allows the microcontroller 135 a method of deriving the displacement.

The look-up table consists of the binary value for the position of the optical plano-parallel window 45 required to displace the line of sight at ten equal divisions in the micrometer's 20 range. The micrometer 20 has a range of 0.1000 of an inch. The binary equivalents of the optical plano-parallel window 45 position required to produce a line of sight displacement at 0.01 of an inch increments were placed in the look-up table and programmed in the microcontroller 135. The look-up table, therefore, provides an optical plano-parallel position to a line of sight displacement relationship which takes account for the equation's non-linearity. The optical plano-parallel window 45 positions which are between the look-up table division points, are interpolated by the microcontroller 135.

Figure 7A:
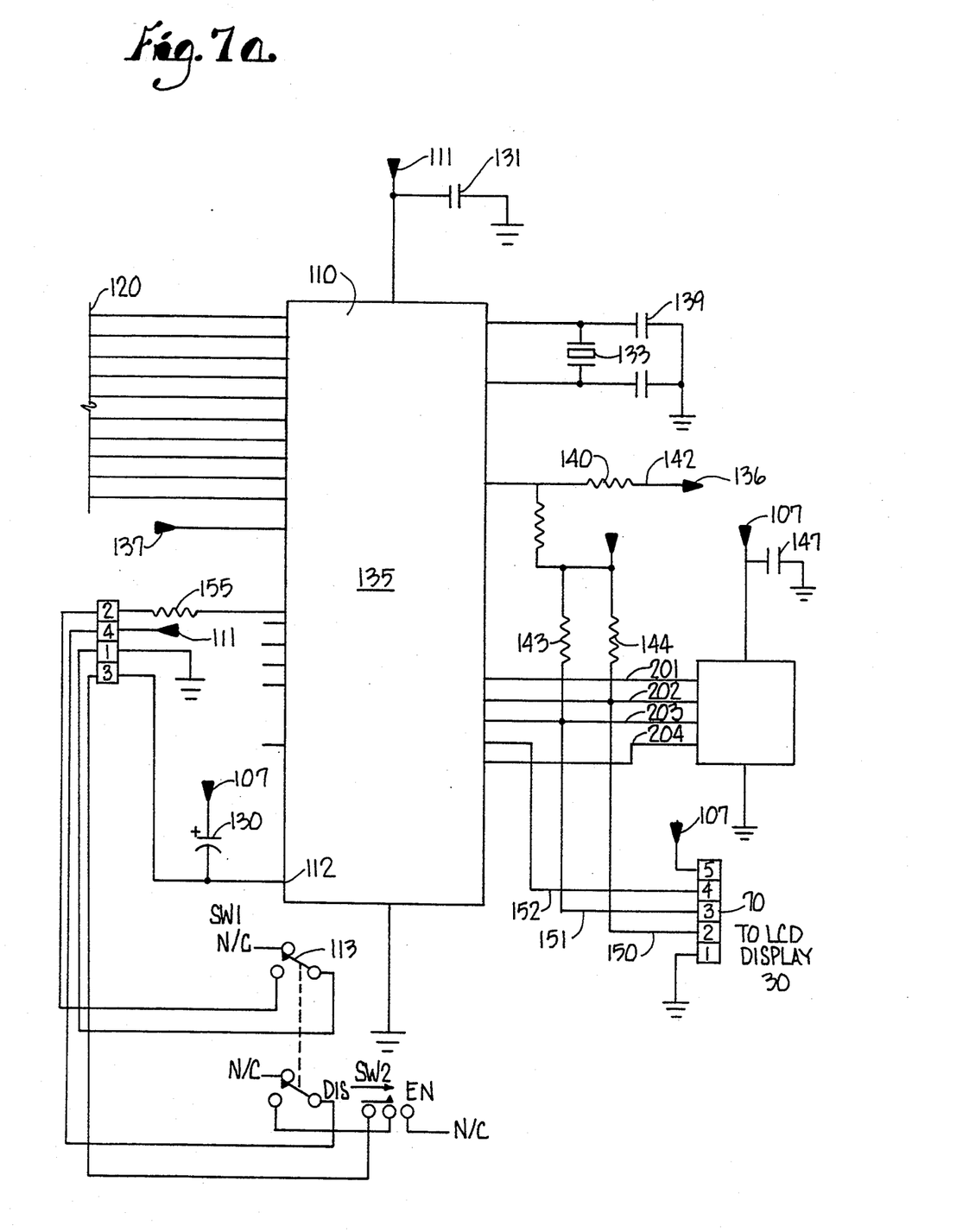
FIG. 7a is a continuation of the block diagram of FIG. 7.

Referring to FIGS. 7a and 8, power to the optical micrometer 20 occurs by closing the switch 113 from the start-up signal 111 to the reset pin 112 of the microcontroller 135 with the switch 2 set to a function select disable position. A pulse is then generated and along with leakage current of a capacitor 130, a signal is transmitted through the connection to an integrated circuit pin 118, FIG. 8, enabling the step up voltage circuit 165, that in the preferred embodiment is a Maxim 630 step-up voltage regulator chip. Holding the microcontroller 135 in a reset state, the power down connection 136 is enabled and sends an electrical signal which turns on the transistor 182 and sends an input signal 184 to the voltage regulator 170, that in the preferred embodiment is a Maxim 663 voltage regulator. The voltage regulator 170 allows the input voltage of the start-up signal 111 to become the voltage regulator signal 107, bringing the voltage regulator 107 approximately equal to the start-up signal 111. The microcontroller 135 remains in the reset state until the power switch 113 is opened and the capacitor 130 is charged, at which point the reset pin 112 is at zero volts. The voltage regulator signal 107 is approximately plus five volts because the step-up voltage circuit 165 steps up the start up signal 111, that is normally plus three volts, to a plus five volts. The voltage regulator signal 107 that is plus five volts is also electrically connected to a voltage inversion chip 180, that in the preferred embodiment is a Linear Technology Chip number 1044. The voltage inversion chip 180 inverts the voltage regulator signal 107 to a voltage invertor signal 109, that is approximately a negative five volts signal. The voltage invertor signal 109 is then electrically transmitted to the analog-to-digital converter chip 110. The voltage regulator signal 107 is simultaneously electrically transmitted to the analog-to-digital converter chip 110 and to a voltage off-set network 100. The voltage off-set network 100 is comprised of two resistors 105 and 104. Once the reset pin 112 is at zero volts, the microcontroller begins operating and executes the embedded program.

The embedded program includes the following steps: initializing the program parameters such as restoring calibration and the programmable functions (units, timeoff, display invert status) from non-volatile memory EEPROM 145 to the microcontroller 135 Random Access Memory (RAM); testing the status of the function select pin and battery low pin and enter measurement mode, which includes loading the test status of the function select pin and battery low pin and entering the measurement mode; loading the automatic power down count; loading the intermediate power down count; determining the position of the optical plano-parallel window 45 position; subtracting the auto zero cycle and center data; determining the polarity (left or right line of sight deviation); multiplying the gain and linearizing the signal; displaying the data; and performing an automatic power down and intermediate power down test. If the automatic power down or intermediate power down have not been obtained, the program returns to the function select status mode test step and continues thereon. The non-volatile memory EEPROM 145 stores the parameters and programmable functions of the microcontroller 135 that must be maintained during power loss. Once the embedded program is executed, the position of the optical plano-parallel window 45 is determined.

As shown in FIGS. 3, 7 and 7a, the determination and displaying of the line of sight displacement through the optical plano-parallel window 45 is enabled by electrically transmitting the voltage regulator signal 107 to the resistance element 62 through the terminal socket connection 101, to the brush wiper 63, to the socket connection 101 pin 2, to the analog-to-digital converter 110, to the microcontroller chip 135, to the digital display 30 through the five strand wire assembly input 70. Referring to FIGS. 3 and 7, the five voltage regulator signal 107, minus the signal drop across the resistor 106, is applied across the resistance element 62. The brush wiper contact position on the resistance element 62 establishes a voltage to optical plano-parallel window 45 position relationship signal 99. The voltage to optical plano-parallel window 45 position relationship signal 99 is then electrically transmitted to positive analog input pin 115 of the analog-to-digital converter 110. The analog-to-digital converter 110 then electrically converts the voltage to window relationship signal 99, minus the signal present at the negative input of analog-to-digital converter 110 created by the offset network 100, to a digital word having a binary value representative of the variation of the displacement of the line of sight through the optical plano-parallel window 45. The number of bits that a given glass position is made up of is defined by the analog-to-digital converter gain. The gain or maximum signal level that the analog-to-digital converter can convert is set by the divider network 102 and 103. The analog-to-digital converter 110 then electrically transmits the digital word signal 120 to the microcontroller 135.

When the position of the optical plano-parallel window 45 is such that it is perpendicular with the line of sight, the microcontroller 135 stores the binary value of this angle position in RAM and non-volatile memory during calibration. Once stored in memory, the binary value is subtracted from all later readings of the resistance element 62, thus setting the digital value to zero. Initially setting the digital value to zero adjusts for errors in the alignment of the wiper 63 on the resistance element 62 and its relationship with the off-set network of the analog-to-digital converter 110. Next, the optical maximum points for the micrometer 20 are located, which are plus or minus 0.100 of an inch. The binary representations of these optical plano-parallel window 45 positions are then read in from the analog-to-digital converter 110, the optical center value is subtracted, leaving a binary equivalent for the position of the optical plano-parallel window 45 with respect to a line of sight with a deviation of 0.1000 of an inch. A multiplication factor, derived by dividing the look-up table maximum displacement value by the actual optical plano-parallel window 45 displacement value, is then saved in the non-volatile memory and RAM and used on all incoming optical plano-parallel window 45 angles. The binary results are then converted to either English or metric units as selected. Therefore, the microcontroller 135 processes each digital word 120 so that it is equivalent respectively to the displacement of the line of sight through the optical plano-parallel window 45. The derived displacement reading in the selected unit of measure is electrically transmitted to the digital display driver (not shown) through the five strand wire assembly 70. The display driver then turns on the programmed segments of the display 30 representative of the displacement value.

The digital display 30 can display the displacement of the line of sight in either English or metric units. The English units are inches, whereas the metric units are millimeters. When the digital display 30 is displaying English units, there is no decimal point indicated. It is assumed that the decimal point will be left of the most significant (the left-most) digit indicated. The display resolution of the digital display 30 is to the nearest one-half thousandths of an inch (0.0005"). The digital display when indicating metric units has a decimal point 94 located at the left of the second digit 93 from the right, as illustrated in FIG. 5. The display resolution in the metric system is to the nearest one-hundredth of a millimeter (0.01 mm).

As shown best in FIGS. 1 and 4, the digital display 30 is located within a digital display cover 73 that is located above the battery 31 and battery cover 32. The digital display cover 73 is also located in front of the power button 80 and function select slide switch 81. The function select slide switch 81 is enclosed by function select slide switch cover 83. The power button 80 and the function select slide switch 81 with cover 83 protrude from the main board cover 59 that encloses the computer circuit board 60.

Referring to FIGS. 7, 7a and 8, once the power button 80 has been depressed and the microcontroller 135 has been powered, the executed embedded program also initiates an automatic power down count (also called a total secure power count) and an intermediate power down count. The intermediate power down is started 40 seconds after the micrometer drum 21 has stopped moving. In this intermediate power down mode, the microcontroller 135 will remove power from the resistance element 62 through the analog ground connection (FIG. 7). By placing the analog-to-digital converter 110 in an idle or low power state, the microcontroller 135 then places itself in a low power state. After a one second delay, the microcontroller 135 exits the idle mode and enables the analog-to-digital converter 110, restoring a signal across the resistive element 62. The optical plano-parallel window 45 position is checked and if no movement is detected, the intermediate power down sequence is repeated. If a change in the optical plano-parallel window 45 position is detected, the measurement mode is entered. If no change is detected after one of the selectable program time intervals is reached, then the micrometer 20 enters its total secure power down mode. The optical micrometer 20 through the microcontroller 135 has a programmable function select menu that includes selecting either the English or metric units; calibrating the micrometer 20; selecting a time interval that the intermediate power down mode will operate before a complete power down occurs; and exiting the programmable function selection mode and returning to the standard measurement display mode. The selectable time intervals are 5, 10 and 15 minutes. The amount of time the micrometer 20 spends in the intermediate selected power down mode will have an impact on the battery 31 life. Once the selected power down time of 5, 10 or 15 minutes has expired, the micrometer 20 will power itself off, allowing only the microcontroller 135 to be powered in a low power state. The process starts by placing the analog-to-digital converter 110 in a software sleep state that deactivates the resistance element 62 and the analog circuitry internal to the analog-to-digital converter 110. The microcontroller 135 electrically transmits the power down signal 142 through the power down connection 136 turning transistor 182 off, which causes the voltage regulator 170 to be deactivated and disables the voltage regulator signal 107. Disabling the voltage regulator signal 107 causes the voltage inversion chip 180, digital display driver and LCD 30, analog-to-digital converter 110 and the step-up voltage circuit 165 to be powered down. Before the microcontroller 135 enters its power down mode, all signal lines to the above mentioned devices are set to zero volts so that the devices are not powered by the signal lines. When the voltage regulator signal 107 through the integrated circuit pin 118 drops to zero volts, the step-up voltage circuit 165 is powered down, which brings the start up signal 111 to read battery voltage. In this power down state, current consumption drops to a few microamps. Therefore, once a complete power down occurs, the digital display 30 will be blanked and the computer circuit board 60 is placed in the low power state. The power button 80 must be depressed to reenter the measurement mode.

As best shown in FIG. 7a, the microcontroller 135 also has a clock timing signal 150 that is generated for the memory chip 145 and display driver chip (not shown). The clock timing signal 150 is used to synchronize the digital data that is electrically transmitted in a serial manner to the display driver or non-volatile RAM 145 through the signal line 151. The electrical signal clock 150 and data 151 are shared by the display driver and the non-volatile memory 145. The electrical signals transmitted to the display driver and the non-volatile memory 145 are directed to devices by their respective enable signals 152 and 201. The digital word signal 120 is later transmitted to the display driver through the shared data signal 151.

An additional feature of the optical micrometer 20 is the low battery warning. When the battery 31 is close to its end of useful life, the low battery warning (Lbat) will be flashed on the digital display 30 in the place of a displacement reading. The low battery message or warning can be cleared from the display 30 by pressing the red power button 80. The micrometer 20 will then enter the measurement mode and operate as normal. This is only a warning that the battery 31 is entering its end of useful life and should be checked for maintenance, as it may fail to operate at any time. Referring to FIGS. 7a and 8, the battery signal enters at connection 160. The signal is divided by the relationship of 161 and 162. The signal enters at the set up regulator 165 at the low battery detection comparator input where it is compared with a reference signal. When the comparator input signal is below the reference signal, the low battery detector output signal goes low. The microcontroller 135 checks the state of the low battery detector output using signal line 137 at power up and sends an LBAT message to the display driver. Additionally, during a measurement operation, the digital read-out display 30 may become inverted to the user as the user inverts the micrometer 20. As best shown in FIGS. 4 and 5, to compensate for the new position of the display face 89, the digits 93 can toggle between the inverted and upright states by pressing the red power button 80. The state of the display 30 will be stored at power down. Upon powering up, the display 30 state (inverted or upright) will be as it was at power down.

Referring to FIGS. 3 and 4, the direct reading off the window mount 48 eliminates the need for the conventional backlash calibration test, because the servo gear in a conventional optical micrometer is not used. Calibration of the optical micrometer 20 is therefore made easier and simpler by requiring the operator to only test for the zero centering and range accuracy of the micrometer 20. Three calibration parameters are derived and stored in the non-volatile memory chip 145, allowing the microcontroller 135 to recall these calibration parameters even after a power loss. The parameters are the centering, left range and right range. These parameters are used to digitally compensate for error in offset and gain created by tolerances and variations of system components of the micrometer 20. The micrometer 20 can then be digitally adjusted as necessary to correct the zero centering and range accuracy.

Therefore, in the operational sense, the digital micrometer 20 is turned on by pressing the red button 80 located behind the display 30. The micrometer has three modes of operation: measurement, intermediate power down and total secure power down. The measurement mode will display the current displacement of the line of sight in the selected unit of measurement. The digital display 30 has a resolution of 0.0005 inches or 0.01 millimeters. In the measurement mode, the least significant digit will flash. This aids in determining the state of the display 30 (inverted or upright) and is used to indicate that the micrometer 20 is in the measurement mode of operation. The measurement mode is entered anytime the red power button 80 is pressed or the micrometer drum 21 has been moved while in the intermediate power down mode. The measurement mode is terminated forty seconds after no movement of the micrometer drum 21 has been detected. The intermediate mode is entered until the total secure power down count is obtained or micrometer drum 21 movement is detected.

The intermediate power down mode is used to conserve battery 31 power when micrometer 20 is not being used. The intermediate power down mode is entered forty seconds after the microcontroller 135 has not detected micrometer drum 21 movement. Once the intermediate power down mode is entered, the flashing of the least significant digit will be inhibited. Upon detection of the micrometer drum 21 movement, while in the intermediate power down mode, the measurement mode will be entered. If no movement of the micrometer drum 21 occurs before the programmed time interval expires, the intermediate power down mode will be exited and complete power down will occur. Once a complete power down occurs, the display 30 will be blanked and the circuit board 60 turned off. The micrometer's power button 80 must be depressed to re-enter the measurement mode.

In the measurement mode, the optical micrometer 20 accomplishes the task of adjusting the line of sight through the optical plano-parallel window 45 for the purpose of measuring minute distances, by using the same optical principal used by the vernier micrometers. An optical plano-parallel window 45 is positioned perpendicular to the line of sight with a known index of refraction and thickness. In the perpendicular position, the optical plano-parallel window 45 has no effect on the line of sight, but as the angle of the optical plano-parallel window 45 to the line of sight is changed, the line of sight will be displaced. The micrometer 20 determines the position of the optical plano-parallel window 45 with respect to the line of sight by using the resistance element 62 and the wiper 63. The wiper 63 is directly connected to the rotating axis of the optical plano-parallel window 45 by making physical contact with the window mount 48. A voltage is applied across the resistance element 62 so that a voltage to optical plano-parallel window 45 position relationship will exist. The resistance element 62 acts like a bridge circuit that senses and varies the voltage of the electrical signal in response to the variation of the inclination of the optical plano-parallel window 45 about the aligned mechanical axis. Using an analog-to-digital converter 110, the optical plano-parallel window 45 position represented by a voltage is converted to a binary number so that it may be manipulated by the eight bit microcontroller 135. Through the use of data derived during calibration of the optical center, range and the look up table, the microcontroller 135 is able to derive the displacement of the line of sight.

The microcontroller 135 then transmits the displacement of the line of sight in the form of a digital word to a digital display 30. The digital display can selectively display English or metric units.

Figure 9:
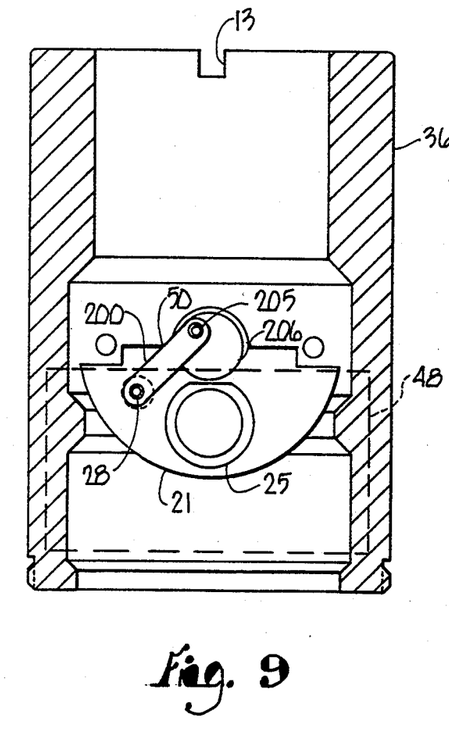
FIG. 9 is a fragmentary view showing a drive mechanism for an optical flat window mounted within the micrometer.
Figure 10:
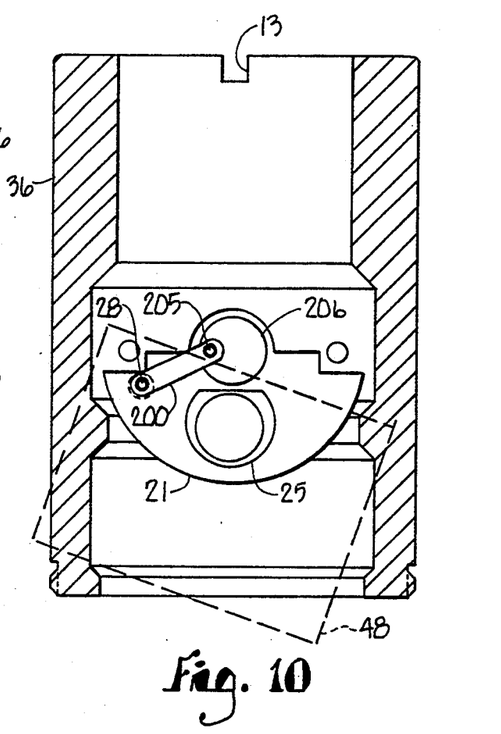
FIG. 10 is a fragmentary view of the drive mechanism showing an exaggerated movement of the drive mechanism.

Finally, in FIGS. 9 and 10, the linkage mechanism 50 is shown in enlarged detail and includes a link bar 200 mounted to the pin 28 extending from the window mount 48 and connected to a post 205 extending from a drum shaft 206. When the drum 21 is rotated, the drum shaft 206 moves, which causes the link bar 200 and the pin 28 to move. This movement causes the window mount 48 to rotate and swing the window 45 from side to side. Continued rotation of the drum 21 throughout 360 degrees or more of rotation resets the link bar 200 so that the drum 21 may be spun continuously.

It is to be understood that while certain forms of the present invention have been illustrated and described herein, it is not to be limited to the specific forms or arrangements or parts described and shown.

What is claimed and desired to be secured by Letters Patent is:

1. An optical micrometer connected to an optical instrument for altering, determining and indicating the displacement of a line of sight through said optical micrometer, said optical micrometer comprising:

a) an axis inclination sensing means to determine the position of an optical flat;
 b) a circuit means being connected to said axis inclination sensing means and operative to provide an electrical signal having a signal property which varies in proportion to an inclination of said optical flat about a respective mechanical axis;
 c) an analog-to-digital (A/D) converter means operatively connected to said circuit means and converting each signal to a digital word having a binary value representative of a displaced line of sight passing through said optical flat from a reference value thereof;
 d) a computer means operatively connected to said A/D converter means and operative to convert each digital word to a displacement reading associated therewith;
 e) a display means connected to said computer means and operative to display a displacement reading equivalent respectively to said inclination of said optical flat about said mechanical axis; and f) said computer means having means for calibration of said optical micrometer, said optical micrometer operative to eliminate a requirement for a backlash test for said calibration, said calibration means including a zero centering test to establish zero centering and a range accuracy test to establish range accuracy and having means for adjusting said zero centering and said range accuracy of said optical micrometer.

2. An optical micrometer as set forth in claim 1 wherein said optical flat is connected to a bar linkage system, said bar linkage system is connected to a drum, said optical flat has means for measuring linear distance by displacing said line of sight through said optical micrometer, and said drum having means to pivot said optical flat thereby displacing said line of sight.

3. An optical micrometer as set forth in claim 2 wherein said computer means and said axis inclination sensing means provides for an indication of said inclination of said optical flat and eliminating backlash errors.

4. An optical instrument for altering, determining and indicating the displacement of a line of sight through said optical instrument, said optical instrument comprising:
   a) an inclination sensing means for determining the displacement of said line of sight, said inclination sensing means having connection means with an optical flat and a bridge circuit means, said inclination sensing means operative to provide an electrical signal which varies in proportion to an inclination of said optical flat which alters an incident angle of light;
   b) said bridge circuit means operative to vary the voltage of said electrical signal in response to said inclination of said optical flat and to provide an output signal in response to said varied voltage of the electrical signal of said bridge circuit means;
   c) an analog-to-digital (A/D) converter means connected to said bridge circuit means and converting said output signal of said bridge circuit means to a digital word having a binary value representative of said output signal;
   d) a computer means including said A/D converter means and with a clock input operatively connected thereto and operative to provide clock pulses to a binary converter means to effect the conversion of said output signal of said bridge circuit means at a time to a respective digital word, and the translation of said digital word to a displacement reading;
   e) a display means connected to said computer means and operative to display said displacement reading which is equivalent respectively to said incident angle of light passing through said optical flat; and
   f) said computer means having means for calibration of said optical instrument, said optical instrument operative to eliminate a requirement for a backlash test for said calibration, said calibration means including a zero centering test to establish zero centering and a range accuracy test to establish range accuracy and having means for adjusting said zero centering and said range accuracy of said optical instrument.

5. The optical instrument set forth in claim 4 wherein said optical instrument has an electrical power supply consisting of a three-volt battery and having means to electrically power said optical instrument, and said computer means has means for indicating a low power warning for said electrical power supply.

6. The optical instrument set forth in claim 4 wherein said computer means has a programming means, said programming means including:
   a) means for selectively converting said digital word from said analog-to-digital converter into metric and English units of measurements;
   b) means for selectively changing a set period of time for said optical instrument to operate without physical movement and initiating a total shutoff of said optical instrument if position of said optical flat has not changed for said set period of time; and
   c) means for storing an orientation for viewing said displacement reading when said optical instrument is shut off.

7. The optical instrument set forth in claim 4 wherein said optical flat is connected to a drum and a bar linkage system, and said optical flat has means for measuring linear distance by displacing said line of sight through said optical instrument, said drum and said bar linkage system having means to pivot said optical flat thereby displacing said line of sight.

8. A method for determining and indicating the amount of displacement of a line of sight through an optical flat of an optical instrument comprising the steps of:
   a) electrically powering said optical instrument through an electrical power supply by selectively pressing a power button;
   b) generating an electrical signal to operate a microcontroller, said microcontroller having means for executing an embedded computer program, said embedded computer program including the steps of:
      i) initializing variables of said embedded computer program;
      ii) loading a total secure power count;
      iii) loading an intermediate power down count;
      iv) determining position of said optical flat;
      v) converting said optical flat position to a digital word having a binary value representative of said line of sight displacement;
      vi) displaying said digital word;
      vii) checking said total secure power count and said intermediate power down count;
      viii) looping back to loading said total secure power count and said intermediate power down count, determining, converting and displaying said optical flat position and checking said position of said optical flat, and if position of said optical flat has not changed and said intermediate power down count is reached, said microcontroller initiating an intermediate power down mode of said optical instrument; and
      looping back to loading said total secure power count and if position of said optical flat has not changed and said total secure power count is reached, said microcontroller initiating a total shutoff of power of said optical instrument.

9. The method set forth in claim 8 including:
   a) inverting an orientation for viewing said digital word on a digital LCD by selectively pressing said power button;
   b) storing said orientation for viewing said digital word when said optical instrument is powered down;

c) displaying said digital word in said orientation for viewing said digital word upon activation of said power button; and d) flashing the least significant digit of said digital word upon activation of said power button.

10. The method set forth in claim 8 wherein said intermediate power down mode includes the steps of:

a) sending a sleep command to an analog-to-digital converter of said optical instrument b) sending an idle mode command to said microcontroller c) powering said microcontroller and said analog-to-digital converter after a set time delay interval;

d) checking for change in said optical flat position;

e) loading said total secure power count and said intermediate power down count, determining said optical flat position, checking for said total secure power count;

f) remaining in said intermediate power down mode by looping back to said sleep command until said optical flat position has changed or said intermediate power down count is reached; and g) upon detecting a change in said optical flat position regenerating said electrical signal to operate said microcontroller, said microcontroller executing said embedded computer program, looping back to loading said total secure power count and said intermediate power down count, determining, converting and displaying said optical flat position, and checking said optical flat position, and if optical flat position has not changed and said intermediate power down count is reached, said microcontroller initiating said intermediate power down mode.

11. The method set forth in claim 8 wherein said intermediate power down mode includes the steps of:

a) sending a sleep command to an analog-to-digital converter of said optical instrument;

b) sending an idlemode command to said microcontroller;

c) powering said microcontroller and said analog-to-digital converter after a set time delay interval;

d) checking for change in said optical flat position;

e) looping back to loading said total secure power count and said intermediate power down count, determining said optical flat position, checking for total secure power count; and f) remaining in said intermediate power down mode by looping back to said sleep command until said total secure power count is reached and said optical flat position has not changed, said microcontroller initiating said total shutoff of power of said optical instrument.

12. The method set forth in claim 8 wherein initiating said total shutoff of power of said optical instrument includes the steps of:

a) deactivating said electrical power supply to components of said optical instrument except for said microcontroller;

b) sending a total shutoff power command to said microcontroller; and c) entering and remaining in a total shutoff power state until said power button is selectively pressed.

13. A method for determining and indicating an amount of displacement of a line of sight through an optical flat of an optical instrument, said method comprising the steps of:

a) electrically powering said optical instrument through an electrical power supply by selectively pressing a power button;

b) generating an electrical signal to operate a microcontroller, said microcontroller having means for executing an embedded computer program, said embedded computer program having variables and including the steps of:

i) initializing said variables pf said embedded computer program;

ii) checking calibration of said optical instrument;

iii) loading a total secure power count;

iv) loading an intermediate power down count;

v) determining position of said optical flat;

vi) converting said optical flat position to a digital word having a binary value representative of said line of sight displacement;

vii) displaying said digital word;

viii) checking said total secure power count and said intermediate power down count;

ix) looping back to checking said calibration of said optical, instrument loading said total secure power count and said intermediate power down count, determining, converting and displaying said optical flat position, and checking said optical flat position, and if said optical flat position has not changed and said intermediate power down count is reached, said microcontroller initiating an intermediate power down mode of said optical instrument; and x) looping back to loading said total secure power count and checking said optical flat position, and if said optical flat position has not changed and said total secure power count is reached, said microcontroller initiating a total shutoff of power of said optical instrument.

14. The method set forth in claim 13 including:

a) inverting an orientation for viewing said digital word on a digital LCD by selectively pressing said power button;

b) storing said orientation for viewing said digital word when said microcontroller initiates said total shutoff of power of said optical instrument; and c) displaying said digital word in said orientation for viewing said digital word upon activation of said power button.

15. The method set forth in claim 13 wherein initiating said total secure power count includes the steps of:

a) deactivating said electrical power supply to said optical instrument;

b) sending a total shutoff power command to said microcontroller; and c) entering and remaining in a total shutoff power state until said power button is selectively pressed.

16. An optical micrometer for altering, determining and indicating an inclination of a line of sight through said optical instrument, said optical instrument comprising:

a) an axis inclination sensing means to determine the position of an optical flat;

b) a circuit means being connected to said axis inclination sensing means and operative to provide an electrical signal having a signal property which varies in proportion to an inclination of said optical flat about a respective mechanical axis;

c) an analog-to-digital (A/D) converter means operatively connected to said circuit means and converting each signal to a digital word having a binary value representative of an incident angle of light passing through said optical flat from a reference value thereof;

d) a computer means operatively connected to said A/D converter means and operative to convert each digital word to a displacement reading associated therewith;

e) a display means connected to said computer means and operative to display a displacement reading equivalent respectively to said inclination of said optical flat;

f) a bar linkage system having connection means with said optical flat, said optical flat having connection means with said axis inclination sensing means and said computer means, said computer means and said axis inclination sensing means having means for providing for accurate calibration of said optical instrument and eliminating a requirement for a backlash test for said calibration;

g) said calibration including a zero centering test and a range accuracy test; and h) said computer means having means for adjustment of zero centering and range accuracy of said optical instrument.

17. An optical instrument set forth in claim 16 wherein said computer means has means for selectively converting said digital word from said analog-to-digital converter into metric and English units of measurements, a read only memory means and is being calibrated for use exclusively with said axis inclination sensing means by a look-up table stored in said read only memory means.

18. The optical instrument set forth in claim 16 wherein said bar linkage system is connected to a drum, said optical flat has means for measuring linear distance by displacing said line of sight.

* * * * *